US008336102B2

(12) United States Patent
Neystadt et al.

(10) Patent No.: US 8,336,102 B2
(45) Date of Patent: Dec. 18, 2012

(54) DELIVERING MALFORMED DATA FOR FUZZ TESTING TO SOFTWARE APPLICATIONS

(75) Inventors: Eugene Neystadt, Kfar-Saba (IL); Nissim Natanov, Haifa (IL); Meir Shmouely, Bellevue, WA (US); Yoram Singer, Jerusalem (IL)

(73) Assignee: Microsoft Corporation, Redmond, WA (US)

( * ) Notice: Subject to any disclaimer, the term of this patent is extended or adjusted under 35 U.S.C. 154(b) by 1126 days.

(21) Appl. No.: 11/756,782

(22) Filed: Jun. 1, 2007

(65) Prior Publication Data
US 2008/0301647 A1 Dec. 4, 2008

(51) Int. Cl.
*G06F 11/36* (2006.01)
*G06F 9/44* (2006.01)

(52) U.S. Cl. ............... 726/25; 726/22; 726/23; 726/24; 713/188; 717/124; 717/127

(58) Field of Classification Search .................. 717/124, 717/127; 726/22–25
See application file for complete search history.

(56) References Cited

U.S. PATENT DOCUMENTS

| 5,542,043 | A | 7/1996 | Cohen et al. |
| 5,758,061 | A | 5/1998 | Plum |
| 5,831,998 | A | 11/1998 | Ozmizrak |
| 6,002,869 | A * | 12/1999 | Hinckley ............ 717/124 |
| 6,314,531 | B1 | 11/2001 | Kram |
| 6,378,088 | B1 | 4/2002 | Mongan |
| 6,584,569 | B2 * | 6/2003 | Reshef et al. ............ 726/25 |
| 6,957,420 | B2 | 10/2005 | Hand, Jr. et al. |
| 7,032,212 | B2 | 4/2006 | Amir et al. |
| 7,055,065 | B2 | 5/2006 | Farchi et al. |
| 7,284,274 | B1 * | 10/2007 | Walls et al. ............ 726/25 |
| 7,900,089 | B2 * | 3/2011 | Hayutin et al. ............ 714/26 |
| 2002/0194613 | A1 * | 12/2002 | Unger ............ 725/118 |
| 2003/0159063 | A1 * | 8/2003 | Apfelbaum et al. ........ 713/200 |
| 2004/0133858 | A1 * | 7/2004 | Barnett et al. ............ 715/530 |
| 2004/0230414 | A1 * | 11/2004 | Hoppe et al. ............ 703/14 |
| 2004/0260516 | A1 | 12/2004 | Czerwonka |
| 2005/0065772 | A1 | 3/2005 | Atkin et al. |
| 2005/0273854 | A1 * | 12/2005 | Chess et al. ............ 726/22 |
| 2005/0273860 | A1 * | 12/2005 | Chess et al. ............ 726/25 |
| 2006/0031718 | A1 | 2/2006 | Thornhill et al. |
| 2006/0041423 | A1 | 2/2006 | Kline et al. |
| 2008/0165961 | A1 * | 7/2008 | Lerouge et al. ............ 380/202 |

OTHER PUBLICATIONS

Abhishek Sharma, Vulnerability Reporting, Analysis and Remediation, 2008, Department of Computer Science Stevens Institute of Technology.*
Aitel, "The Advantages of Block-Based Protocol Analysis for Security Testing", retrieved at http:www.immunitysec.com/downloads/advantages_of_block_based_analysis.pdf, Immunity Inc., New York, USA, Feb. 4, 2002, pp. 8.
"Antiparser", retrieved on Aug. 17, 2006 at <<http://antiparser.sourceforge.net/>>, pp. 1.
Sprundel, "Fuzzing: Breaking Software in an Automated Fashion", retrieved at <<http://events.ccc.de/congress/2005/fahrplan/attachments/582-paper_fuzzing.pdf>>, Dec. 8, 2005, pp. 1-5.

* cited by examiner

*Primary Examiner* — David Pearson
*Assistant Examiner* — Amir Mehrmanesh
(74) *Attorney, Agent, or Firm* — Lee & Hayes, PLLC

(57) ABSTRACT

Systems and methods to deliver malformed data for software application fuzzing are described. In one aspect, a fuzzing engine receives well-formed valid input data from a test automation tool. The received data is for input into a software application to implement a functional test. Responsive to receiving the well-formed valid input data, the fuzzing engine automatically generates corresponding malformed data based on characteristics of the well-formed valid input data. The application is then automatically fuzzed with the malformed data to notify an end-user of any security vulnerabilities in one or more code paths of the application used to process the malformed data.

20 Claims, 5 Drawing Sheets

DELIVERING MALFORMED DATA FOR FUZZ TESTING TO SOFTWARE APPLICATIONS

BACKGROUND

To avoid certain types of security vulnerabilities, computer-program applications should verify that consumed input is well-formed, without making false assumptions about input consistency. Otherwise, security vulnerabilities such as buffer overruns resulting from malformed input and other types of errors may be fatal to proper functioning and results of the application. To locate any such vulnerabilities, software developers often implement "fuzz testing", or "fuzzing" prior to releasing software. Fuzzing is a software testing technique that typically provides random data ("fuzz") as computer-program application data inputs to identify access violations and/or buffer overruns (not functional problems). If the application fails in view of such randomly generated data inputs, for example, by crashing, or by failing built-in code assertions, a software developer generally notes and attempts to address the defects. However, conventional software fuzz testing techniques are typically very time consuming and labor intensive, often requiring iterative manual effort and/or use of inefficient automated techniques. For instance, existing fuzzing techniques generally only locate very specific and simple faults, often with poor code coverage. For example, if input includes a checksum which is not properly updated to match other random changes, only the checksum validation code will be verified. Every fuzzer is generally designed to find a different set of vulnerabilities, or bugs.

SUMMARY

Systems and methods to deliver malformed data for software application fuzzing are described. In one aspect, a fuzzing engine receives well-formed valid input data from a test automation tool. The received data is for input into a software application to implement a functional test. Responsive to receiving the well-formed valid input data, the fuzzing engine automatically generates corresponding malformed data based on characteristics of the well-formed valid input data. The application is then automatically fuzzed with the malformed data to notify an end-user of any security vulnerabilities in one or more code paths of the application used to process the malformed data.

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

BRIEF DESCRIPTION OF THE DRAWINGS

In the Figures, the left-most digit of a component reference number identifies the particular Figure in which the component first appears.

DETAILED DESCRIPTION

Overview

Figure 1:
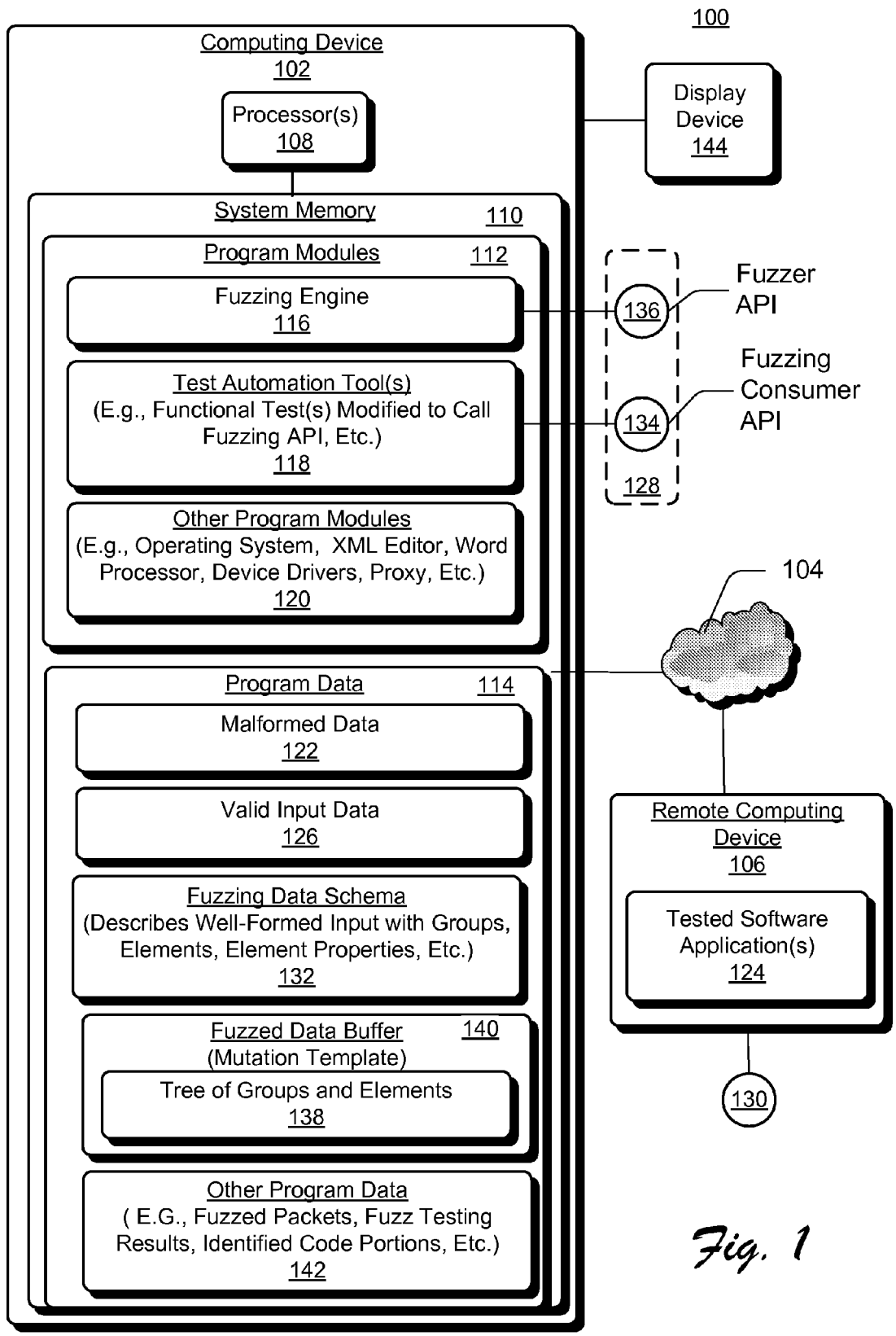
FIG. 1 shows an exemplary system for delivering malformed data for software application fuzzing, according to one embodiment.

Conventional software fuzzing techniques typically deliver malformed inputs to software either by creating a file with malformed content for input into a tested application (e.g., by parsing), or by developing a specific proprietary fuzzing test tool to deliver malformed data at appropriate instances. Providing malformed inputs to software via a file is essentially limited because in certain scenarios not all tested applications are designed to accept input as files. For example to perform fuzzing of a web server fuzzed inputs need to be sent as http requests. Additionally, providing only malformed input via a final may not be sufficient to test all code paths of an application. For example, to reach a particular code path, a software application may need to be brought to one or more required states via configuration operations before the input data can be properly input to the code path for testing. For example to fuzz web server authentication implementation, it should be configured to request authentication. Moreover, developing a specific proprietary fuzzing test tool to input malformed content into software typically requires complex implementation of the application's code to configure tested portions and drive those portions to a target state before the tested portions can be fuzzed. Producing such complex implementations is generally a time consuming and labor intensive task.

Systems and methods to deliver malformed data for fuzz testing software applications are described below. These systems and methods address the described limitations of existing techniques to deliver malformed inputs to a software application to fuzz the software application. Software targeted for fuzzing or being fuzzed is frequently called a "tested application" or "tested software." To this end, the systems and methods include a fuzzing engine that receives valid (well formed) data for input into a tested software application. Responsive to receiving the valid data, and in one implementation, the fuzzing engine utilizes a fuzzing data schema that describes characteristics of the well-formed input from a test automation tool to generate corresponding malformed data for input into and fuzzing the tested application. In another application, the fuzzing engine is hard-coded to present malformed data to the tested application in response to receiving particular valid input data. That is, the received valid input data is mapped to corresponding malformed data, or the malformed data is automatically generated from the valid input data via one or more well known data fuzzing algorithms. In one implementation, the malformed data is provided to the tested application via a fuzzing API, respective portions of the fuzzing API are implemented by the fuzzing engine and a test automation tool. In one implementation, the tested application is brought to a particular application state before the systems and methods begin fuzzing the tested application. In another implementation, the malformed data is provided to the tested application via a network proxy or a local filter driver that intercepts about input data being input into the tested application. Once intercepted, the valid input data is fuzzed and forwarded to the tested application to identify any security vulnerabilities.

These and other aspects of the systems and methods for Delivering malformed data for fuzz testing software applications are now described in greater detail An Exemplary System Although not required, the systems and methods to deliver malformed data for fuzz testing software applications are described in the general context of computer-program instructions being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

FIG. 1 shows an exemplary system 100 to deliver malformed data for fuzz testing software applications, according to one embodiment. In this implementation, system 100 includes computing device 102 coupled over communication network 104 to remote computing device 106. Computing device 102 represents, for example a general purpose computing device, a server, a laptop, a mobile computing device, and/or so on, that accepts information in digital or similar form and manipulates it for a specific result based upon a sequence of instructions. Computing devices 102 and 106 include one or more processors coupled to respective tangible computer readable data storage media such as a system memory. System memory includes program data and computer-program modules comprising computer-program instructions for execution by a processor.

For example, computing device 102 includes processor 108 coupled to a tangible computer-readable data storage medium such as a system memory 110. System memory 110 includes, for example, volatile random access memory (e.g., RAM) and non-volatile read-only memory (e.g., ROM, flash memory, etc.). Processor 108 may be a microprocessor, microcomputer, microcontroller, digital signal processor, etc. System memory 110 includes program modules 116. Each program module 116 is a computer-program application including computer-program instructions executable by processor 108. System memory 110 also includes program data 124 that is generated and/or used by respective ones of the program modules 116.

In this implementation, for example, computing device 102 program modules 112 include fuzz-testing ("fuzzing") engine 116, test automation tool 118, and "other program modules" 120 such as an Operating System (OS) to provide a runtime environment, an XML editor, device drivers, etc. Fuzzing engine 116 generates malformed data 122 for input into a tested software application 124. Fuzzing engine 116 generates one or more permutations of malformed data 122 from valid (well-formed) input data 126 for the tested application. Exemplary aspects of fuzzing data schema 132 are described in greater detail below in the section titled "Modeling Well-Formed (Valid) Input Data for Software Application". In another implementation, fuzzing engine 116 uses known techniques to malformed data 122 from valid input data 126. In the implementation of FIG. 1, tested software application 124 is shown on remote computing device 106. However, in another implementation, tested software application 124 is on a same computing device as fuzzing engine 116. Such an alternate implementation is described below in the section titled "Proxy", wherein the proxy is a device driver, or "filter proxy."

Fuzzing engine 116 inputs, using one or more of multiple possible data input techniques, the malformed data 122 into tested application 124 to fuzz tested application 124. These techniques include, for example, delivering malformed data 122 using a fuzzing Application Program Interface (API) 128, delivering malformed data 122 as a network proxy, delivering malformed data 122 via a filter interface, and/or so on. Each of these respective techniques to deliver malformed data 122 to tested application to fuzz the tested application and identify any security vulnerabilities are now described.

An Exemplary Fuzzing API

In one implementation, the fuzzing engine 116 and test automation tool(s) 118 (or other applications) expose a respective portion of a fuzzing API 128 to fuzz a tested application 124. The particular implementation of a test automation tool 118 is arbitrary and that it is a function of the particular implementation of the software application being tested (i.e. tested software application 124). In one implementation, test automation tool 118 performs both functional testing (to assess predetermined application functionality responsive to receipt of valid data inputs) and fuzz testing of tested application 124. We now describe an exemplary implementation and use of fuzzing API 128.

TABLE 1

AN EXEMPLARY FUZZING API

```
class FuzzingConsumer   // Exposed by a test automation tool 118
{
   socket _s;
public:
   FuzzingConsumer (socket *s): _s (s) { }
   int Consume (char *input, int len) {return <fuzzed data to tested
                                               application>;}
                                  // E.g., send (s, input, len, 0), or call an
                                  // API with input as a parameter, etc..
}
class Fuzzer            // Exposed by fuzzing engine 116
{
   Initialize (String Schema, String TestCase, FuzzingConsumer
   Consumer);
   DoFuzzing (byte Input[ ]); // Calls Consumer.Consume (...)
}
```

Referring to TABLE 1, class FuzzingConsumer is implemented by test automation tool 118 to allow fuzzing engine 116 to fuzz a tested application 124. For purposes of exemplary illustration, interfaces exposed via the Fuzzing Consumer class are shown as fuzzing consumer API 134, which is respective portion of fuzzing API 128. The particular implementation of class FuzzingConsumer is arbitrary, depending on the particular implementation of how the tested application 124 obtains data inputs (e.g., via pre-specified data input mechanisms such as an API, a socket, a file, etc.). For instance, if software application 124 is an SMTP application, fuzzing engine 116 sends fuzzed data to the SMTP application via a socket. In this particular implementation, and for purposes of exemplary description, class FuzzingConsumer is designed to provide input to the tested application via a socket "s". The socket structure is well known. For example, in one implementation, the socket is an Internet socket (or commonly, a network socket), representing a communication end-point unique to a machine 102 or 106 communicating on an Internet Protocol-based network 104, such as the Internet. An Internet socket indicates, for example, one or more of a protocol (TCP, UDP, raw IP, etc.), a local IP address, a local port, a remote IP address, and a remote port.

The FuzzingConsumer.Consume" interface is called by the fuzzing engine 116 to deliver fuzzed data (a respective portion of malformed data 122) to tested application 124. The particular implementation of "FuzzingConsumer.Consume"

is arbitrary because Consume is designed to work with the particular technique/methodology implemented by the tested application to receive input data. For example, in one implementation, the fuzzed data is sent to tested application 124 using a socket over network 132 to the tested application. In another implementation, for example, or application 124 is local to computing device 102, the fuzzed data is passed to tested application 124 via a call to an exposed API 130, via a file, and/or so on. The particular implementation of API 130 is arbitrary as it is a function of the particular implementation of tested application 124.

Referring to TABLE 1, class Fuzzer does this implementation, for example, exposes interfaces Fuzzer.Initialize and Fuzzer.DoFuzzing, both of which are called by a test automation tool 118 to fuzz tested application 124. For purposes of exemplary illustration, interfaces exposed via class Fuzzer are shown as API 136, which is respective portion of fuzzing API 128. Fuzzer.Initialize initializes parameters to enable fuzzing the tested application 124. In this implementation, such parameters include, for example, "Schema", "TestCase", and "Consumer." "Schema" identifies a fuzzing data schema 132 for initialization. Exemplary aspects of fuzzing data schema 132 are described in greater detail below in the section titled "Modeling Well-Formed (Valid) Input Data for Software Application". Interface Fuzzer.Initialize ( . . . ) prepares the specified fuzzing data schema 132 for fuzzing. Fuzzing Engine would then perform initialization of the engine, such as schema loading and/or schema 118 compilation.

The "TestCase" parameter indicates a particular predetermined application state of multiple possible application states where fuzzing of the tested application should begin. The particular execution states of an application are arbitrary, being a function of the particular implementation of the application. For example, please consider a typical two state web application, which (1) performs login, returning a session cookie, and (2) requires this cookie to be provided for all further requests. In this example, a first TestCase will indicate a need to fuzz the login request, and a second TestCase will indicate a need to fuzz regular application request, which will indicate a need for fuzzing engine to place a session cookie in the request. In a scenario where application requests in the 2$^{nd}$ state are to be fuzzed, fuzzing engine 116 allows test automation to perform processes to bring the tested application to the target state (e.g., test automation logs-in, obtains session cookie, and/or so on). In this example, when the session cookie is present, fuzzing engine 116 performs fuzzing of application request(s).

The "Consumer" parameter of Fuzzer.Initialize identifies a specific instance of class FuzzingConsumer (described above) that has been instantiated by test automation tool 118. Responsive to receiving this parameter, fuzzing engine 116 initializes the specific instance by keeping the reference to consumer interfaces, so that it can use it later when producing fuzzing output. Fuzzing.DoFuzzing" interface is called by test automation tool 118 to fuzz input data specified by "Input[ ]." In this implementation, for example, "DoFuzzing" builds fuzzed data and passes it to Consumer.Consume to send the fuzzed input to tested application 124.

TABLE 2 shows exemplary functional test automation code before it was modified to utilize fuzzing API 128 to fuzz a tested application 124. This non-modified functional test example is shown to compare and contrast a purely functional test to a functional test that has been modified to implement fuzzing via the fuzzing API, as described below with respect to TABLE 3. The functional test of TABLE 2, as do all functional tests, validates that certain functionality in a tested application works as expected. The tested functionality, as well as the particular implementation of the functional test, is clearly arbitrary because it is a function of the particular implementation/architecture of the tested application.

TABLE 2

AN EXEMPLARY FUNCTIONAL TEST

```
void test (socket s, int param)
{
    char buf [100];
    sprintf (buf, "Test input %d", param);
    send (s, buf, strlen (buf), 0);
}
```

Referring to TABLE 2, for purposes of exemplary illustration and description, the tested functionality of this example is to drive the tested application 124 to an execution state that is responsive to receiving the indicated input data at the indicated socket (please see the call to "send"). As described, another implementation of the tested application may use one or more of an API, a file, etc. to receive input data. In this manner, the particular response by test application to receiving the input can then be evaluated for correctness.

TABLE 3 shows the same exemplary functional test automation code as TABLE 2, with the exception that the code of TABLE 2 has been modified (modifications are italicized) to utilize the fuzzing API 128 (a combination of APIs 134 and 136) to fuzz tested application 124.

TABLE 3

AN EXEMPLARY MODIFIED FUNCTIONAL TEST FOR FUZZING

```
void test (socket s, int param)
{
    FuzzingConsumer fc (s);
    Fuzzer fuzzer = new Fuzzer ( );
    Fuzzer.Initialize ("c:\temp\schema.fgxml", "http-request", fc);
    char buf [100];
    sprintf (buf, "Test input %d", param);
    fuzzer.DoFuzzing (buf);    // Please note that "send" was replaced
                               // with this fuzzing operation.
}
```

Referring to TABLE 3, for purposes of exemplary illustration and description, the tested functionality of this example is to drive the tested application to an application/execution state that is responsive to receiving the indicated input data at the indicated socket (please see the call to "send" in TABLE 2 and FuzzingConsumer.Consume). In this manner, the positive code path(s) used to respond to receipt of valid input data can be fuzzed with corresponding malformed data 122. In one implementation, test automation tool 118 performs both functional testing and fuzz testing.

Proxy

In another implementation, fuzzing engine 116 is implemented in association with proxy such as a network based proxy or a local filter driver to respectively and transparently intercept network 104 and/or local communication(s) between test automation tool(s) 118 and tested application 124. For purposes of exemplary illustration, such a proxy is shown as a respective portion of "other program modules" 120. In one implementation, the test automation tool performs functional testing to assess predetermined application functionality responsive to receipt of valid data inputs, not fuzz testing. The intercepting proxy redirects the intercepted communication(s) to fuzzing engine 116. The fuzzing engine parses the intercepted communication to identify and fuzz at least a subset of the data associated with the intercepted communication(s) to generate fuzzed data (i.e., respective portions of malformed data 122). In certain scenarios such as network-based communication, the intercepted communication may be a packet associated with a protocol (e.g., TCP, UDP, DCOM, RPC, etc.). In such scenarios, fuzzing engine 116 maintains correctness (e.g., header(s), etc.) of the protocol and malforms only data targeted for consumption by tested application 124 to generate fuzzed packets (please see "other program data" 142). The fuzzing engine returns the fuzzed data (possibly representing fuzzed packet(s)) to the proxy, which directly forwards the fuzzed data to the tested application for consumption.

For example, fuzzing engine 116 parses well formed data received from test automation 118. In one implementation, for example, fuzzing engine 116 attempts to match the parsed data to characteristics in fuzzing data schema 132 (or a hard-wired malformed version) and a current state (test case). If the input was not matched, it is assumed to belong to a different state and is passed as is to the tested application (local in the scenario of a local filter driver proxy, or remote in the case of a network proxy). If the input matches the schema and testcase, fuzzing engine 116 applies fuzzing transformations and produces fuzzed data, which is then sent to tested application.

Figure 2:
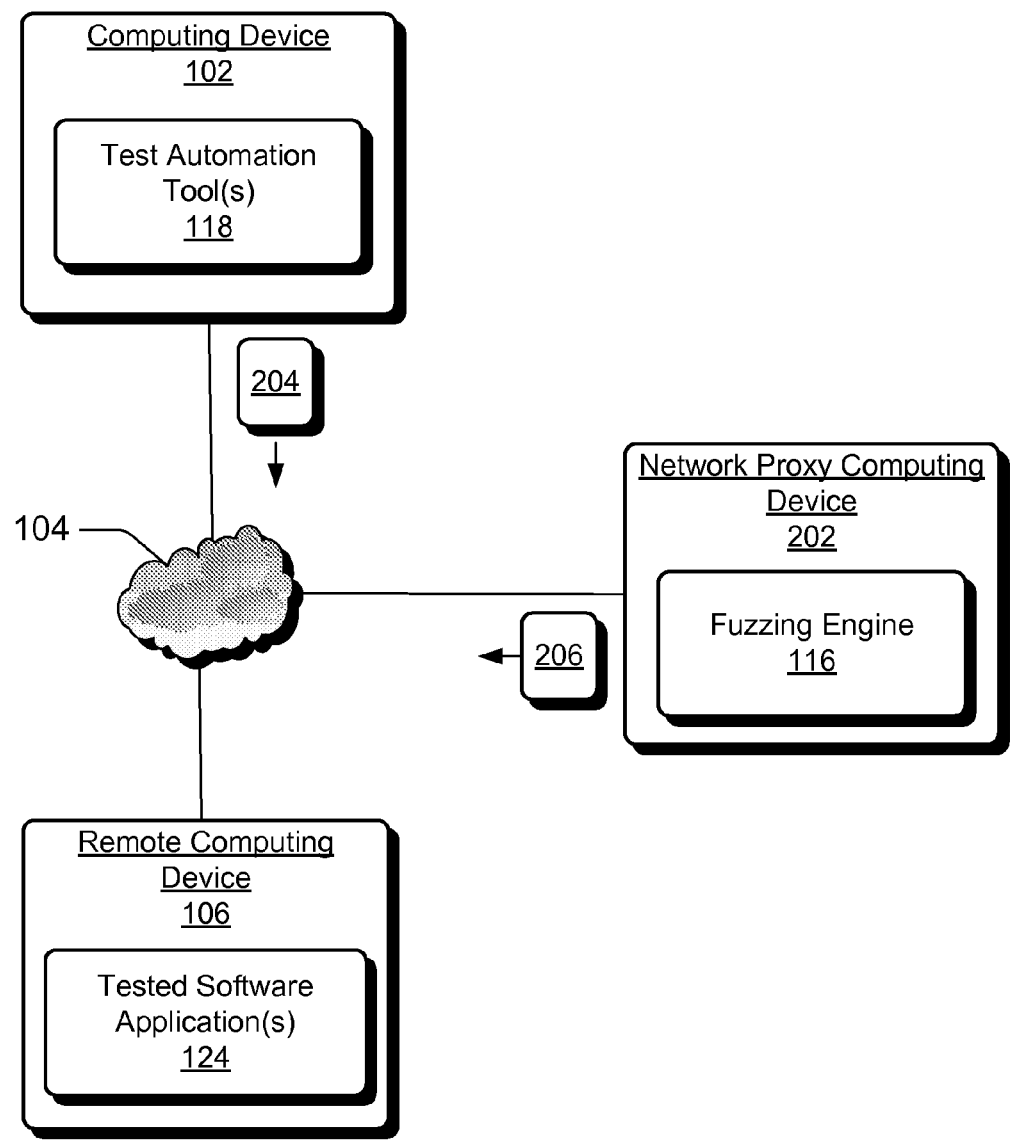
FIG. 2 shows an exemplary system for using a network proxy to deliver malformed data software application fuzzing, according to one embodiment.

FIG. 2 shows an exemplary system for using a network proxy to deliver malformed data for fuzzing a software application, according to one embodiment. For purposes of exemplary illustration and discussion, aspects of FIG. 2 are described with respect to FIG. 1. For example, the left-most numeral of a reference number indicates the particular figure where the component was first introduced. In this example, network proxy computing device 202 (FIG. 1) comprises fuzzing engine 116 to intercept network communications 204 from test automation tool 118. In this example, the network communications 204 are initially directed to tested software application 124 as well-formed data input. In one implementation, test automation tool 118 is a functional test computer-program application, as compared to a fuzzing application. The fuzzing engine 116 intercepts the network communications 204, malforms the associated well-formed data, and forwards the malformed data to the same respective input destinations (e.g., socket(s), etc.) as originally indicated by respective ones of the network communications 204. In one implementation, the well-formed data is fuzzed using a fuzzing data schema 132. In another implementation, the well-formed data is fuzzed via one or more well-known fuzzing techniques (e.g., techniques based on data type, etc.).

Modeling Well-Formed (Valid) Input Data for a Software Application

In one implementation, a software developer or other user manually defines fuzzing data schema 132. For example, a user interfaces with an Extensible Markup Language (XML) editing application to generate fuzzing data schema 132. Although fuzzing data schema 132 is shown as local to computing device 102, in another implementation, fuzzing data schema 132 is remote from computing device 102 (e.g., in a database coupled to computing device 102 over a network 104, etc.). Fuzzing data schema 132 describes/models characteristics (e.g., data types, attributes, relationships, input sequences, etc.) of well-formed valid input data (e.g., input data, message protocol formats, etc.) for a particular software application (e.g., tested application 124). This data modeling does not directly provide specific instances of well-formed data for the software application, but rather describes attributes, characteristics, etc. that a specific instance of well-formed data would have. The software application can be any arbitrary application. For instance, valid input data to a web browser software application 124 includes, for example, HTTP protocol response message to present HTML web pages. In another example, valid input data to a SMTP server software application 124 include data to present SMTP-based messages. In either of these exemplary scenarios, the user models corresponding protocols (e.g., HTTP, HTML, SMTP, and/or so on), including each specific form of the protocol. Examples of valid input data modeling for fuzzing data schema 132 are presented below.

To model valid (well-formed) input data for software application 124, a user decomposes the input data into atomic groups of groups of elements or primitive elements (strings, numbers, etc.). For each element, the fuzzing data schema 132 indicates data type, valid values or relationships (e.g., attributes describing legitimate variations of the element such as data length, valid ranges, minimum/maximum values, and/or so on). Such relationships/attributes/valid formats indicate appropriate value(s) of an element for well-formed (i.e., expected) input into the software application. For variable length fields, fuzzing data schema 132 indicates how to detect field termination (e.g., by whitespace or carriage return character, etc.). TABLES 4 and 5 respectively show an exemplary set of elements (data fields and attributes) and groups of elements or groups (e.g., a group of groups) to model well-formed input data for software application 124. Although a certain number of elements and groups are described with respect TABLES 4 and 5, it can be appreciated that system 100 can use other elements and groups to model well-formed input data for software application 124.

TABLE 4

EXEMPLARY ELEMENTS TO DESCRIBE WELL-FORMED INPUT

| Name | Purpose |
|---|---|
| Character String | String with ASCII or Unicode characters of variable length. In this implementation, length is fixed or determined by specified terminator. In one implementation, a valid character set is specified. |
| Numeric String | Number encoded as string. Can be signed or unsigned. Can be integer or floating type. Valid range(s) and/or floating point precision is specified. |
| Integer | Number binary encoded. Can be signed or unsigned. Valid ranges are specified. |
| Byte Array | Stream of binary bytes. Length is fixed or determined by specified terminator. |
| Bit Array | An array data structure which compactly stores individual bits (0 or 1) |

Referring to TABLE 4, and in this implementation, respective ones of well-formed data elements for input into software application 124 are modeled in fuzzing data schema 132, for example, as a corresponding character string, numeric string, integer, byte array, or bit array. A character string is a string of ASCII or Unicode characters of variable length. String length is fixed or determined by a specified terminator. In one implementation, a valid character set is specified. A numeric string is a number encoded as a string. Such a number (e.g., integer, binary coded number, floating point) is signed or unsigned. In one implementation, valid range relationships and/or precision attribute(s) is/are specified for a number. A byte array element is a stream of bytes. The length of the byte array is fixed or determined by a specified terminator. A bit array element is an array data structure which compactly stores individual bits (0 or 1).

TABLE 5

EXEMPLARY GROUPS TO DESCRIBE WELL-FORMED INPUT

| Name | Purpose |
|---|---|
| Sequential | Multiple elements or groups in a specified order are contained in a sequential group (a group can encapsulate other groups). |
| Single-Choice | Only one element or group out of specified list of elements or groups is contained in a single-choice group |
| Multi-Choice | Multiple elements or groups in any order are contained in a multi-choice group |
| Bit Array Group | A list of binary bits of a certain length is contained in a bit array group |

Referring to TABLE 5, and in this implementation, groups in fuzzing data schema 132 include, for example, one or more sequential groups, single-choice groups, multi-choice groups, and bit array groups. A sequential group includes multiple elements or groups of element(s) in a specified order. For example, if software application 124 expects to receive element (field) "A", field "B", and field "C", in the specified order, schema would contain a sequential group with data fields (elements) A, B and C. A single-choice group represents only one element or group out of possible options. A multi-choice group represents multiple elements or groups in any order contained in the group. A bit array group is a list of bits contained in the group.

For example, and in one implementation, fuzzing data schema 132 describes a simple HTTP Message in XML as follows:

```
<SequentialGroup name="HTTP Message">
    <SequentialGroup name="Request Line">
        <String name="Method" TerminatedBy="SPACE"/>
        <String name="URI" TerminatedBy="SPACE"/>
        <String name="VERSION" TerminatedBy=
/>
    </SequentialGroup>
    <MultiChoiceGroup name="Headers">
        <SequentialGroup name="Header">
            <String name="Name" TerminatedBy=":"/>
            <String name="Value" TerminatedBy=
/>
        </SequentialGroup>
    </MultiChoiceGroup>
    <ConstString value=
/>
    <ByteArray name="body"/>
</SequentialGroup>
In the above example, "SPACE" = "".
```

Valid Input Data Generation and Mutation to Generate Malformed Input

In one implementation, fuzzing engine 116 parses fuzzing data schema 132 to create valid input data 126. Valid input data 126 represents data that conforms to respective elements in fuzzing data schema 132. Since fuzzing application models well-formed data for input into software application 124, valid input data 126 represents valid data for input into software application, i.e., data that software application 124 was designed to consume or process.

In one implementation, for example, fuzzing engine 116 randomly generates valid input data 126 by iterating through each group and element combination in fuzzing data schema 132, generating respective portions of valid input data according to the characteristics of the specific group type (e.g., sequential, single-choice, multiple-choice, etc) and element type (character string, numeric string, integer, length, valid range, etc.). For example, to generate valid input data 126 associated with a single choice group, one of the specified element(s) is randomly selected and created. In another example, fuzzing engine 116 generates a string element by iterating between zero (0) and a random length, within an allowed specified maximum indicated by element attributes/properties (e.g., valid range, minimum/maximum values, byte array length, etc.). For every character, a random character within an allowed specified set is generated.

After creating valid input data 126, and in one implementation, fuzzing engine 116 parses and mutates/changes valid input data 126 to generate malformed data 122 (properly formed invalid data) for input to and fuzz-testing of software application 124. To this end, fuzzing engine 116 parses valid input data 126 to generate a tree of groups and elements 138 and corresponding attributes (valid ranges, characteristics, etc) to representing valid input data 126. Tree 138 isolates valid element data associated with respective individual elements of valid data 126 so that malformed data 122 can be generated from respective ones of the isolated elements.

For example an HTTP Message that would correspond to above schema would be:

GET /dir1/dir2/file.htm HTTP/1.0
HeaderA: valuea
HeaderB: valueb
Body

In this example, "GET" string corresponds to "Method" token, "HeaderA" and "HeaderB" correspond to "Header" sequential group and "Body" corresponds to "body" ByteArray.

Next, and in one implementation, fuzzing engine 116 applies one or more known fuzzing algorithms to at least a subset of the data elements in tree 138 to corrupt the data elements according to well-known data type based vulnerability patterns. For instance, one exemplary fuzzing algorithm inserts null values into string element(s). Another exemplary fuzzing algorithm, for example, may sets integer value(s) to a maximum value+1 in a specified allowable range, and/or so on. Fuzzing engine 116 further serializes the resulting mutated data tree (i.e., a data tree with fuzzed/corrupted data inputs), resulting in fuzzed data buffer Q126 (or mutation template). Serialization is a common computer term for converting a data structure comprised of a few elements into a data buffer. For purposes of exemplary description, a mutation template is a sample of a legitimate data.

Exemplary Data Fuzzing Result Presentation

Responsive to receiving a piece of malformed data 122, if software application 124 crashes (or otherwise performs contrary to target design), the fuzzing operations have identified a security vulnerability in a code portion of software application 124 corresponding to the received piece of malformed data 122. In this scenario, an end-user of system 100 is put on notice by the crashing or contrary operations that the software application 124 has one or more corresponding code paths are vulnerable with respect to security. In another implementation, such crashing and/or contrary operations cause system 100 to automatically notify a user (e.g., via a display device) of information associated with the identified security vulnerability. Otherwise, if no crash (or other unusual behavior) of software application 124 occurs, no security vulnerability was identified in the corresponding portion of code (i.e., the code portion is validated).

Exemplary Procedures

Figure 3:
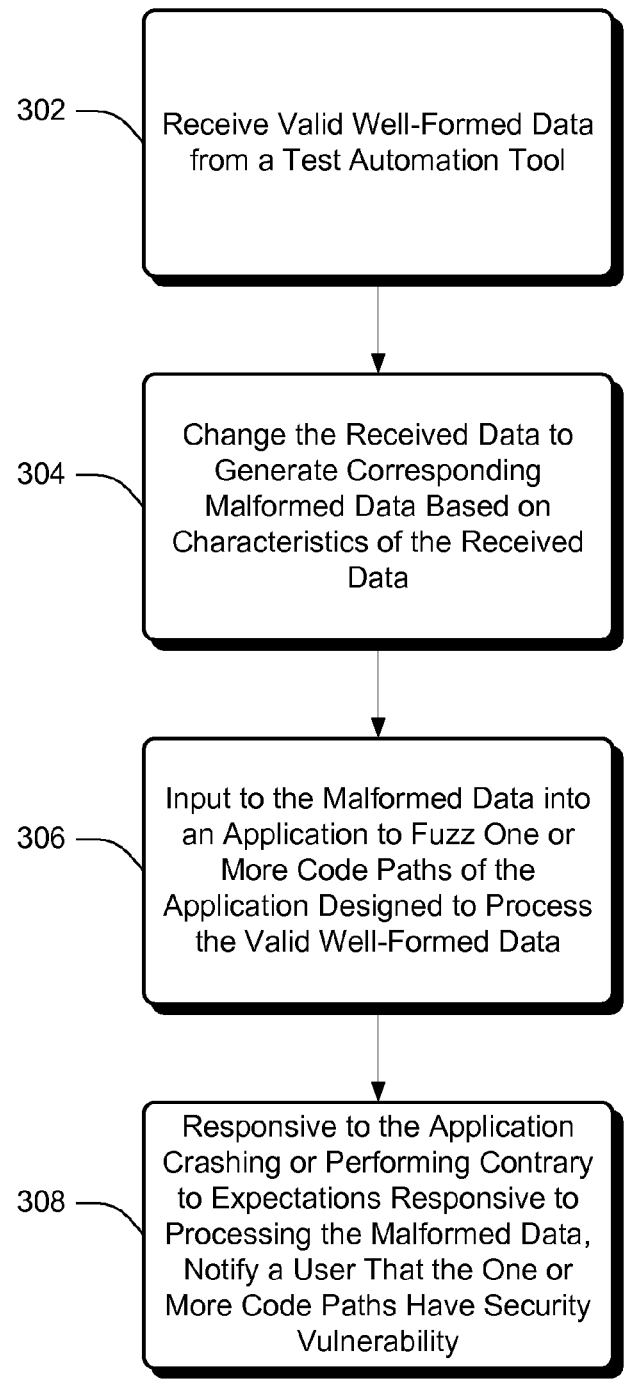
FIG. 3 shows an exemplary procedure to deliver malformed data for software application fuzzing, according to one embodiment.

FIG. 3 shows an exemplary procedure 300 to generate and deliver malformed data for software application fuzzing, according to one embodiment. For purposes of exemplary illustration and discussion, aspects of FIG. 3 are described with respect to FIG. 1. For example, the left-most numeral of a reference number indicates the particular figure where the component was first introduced. Referring to FIG. 3, operations at block 302 receive valid well-formed data 126 from a test automation tool 118. Operations of block 304 change the received data 126 to generate corresponding malformed data 122 based on characteristics of the received data. Operations at block 306 input the malformed data 122 into an application 124 to fuzz one or more code paths designed to process the valid well-formed a data. Operations at block 308, responsive to the application 124 crashing or otherwise performing contrary to expectations responsive to the operations of block 306, notify a user that the one or more code paths have security vulnerability.

Figure 4:
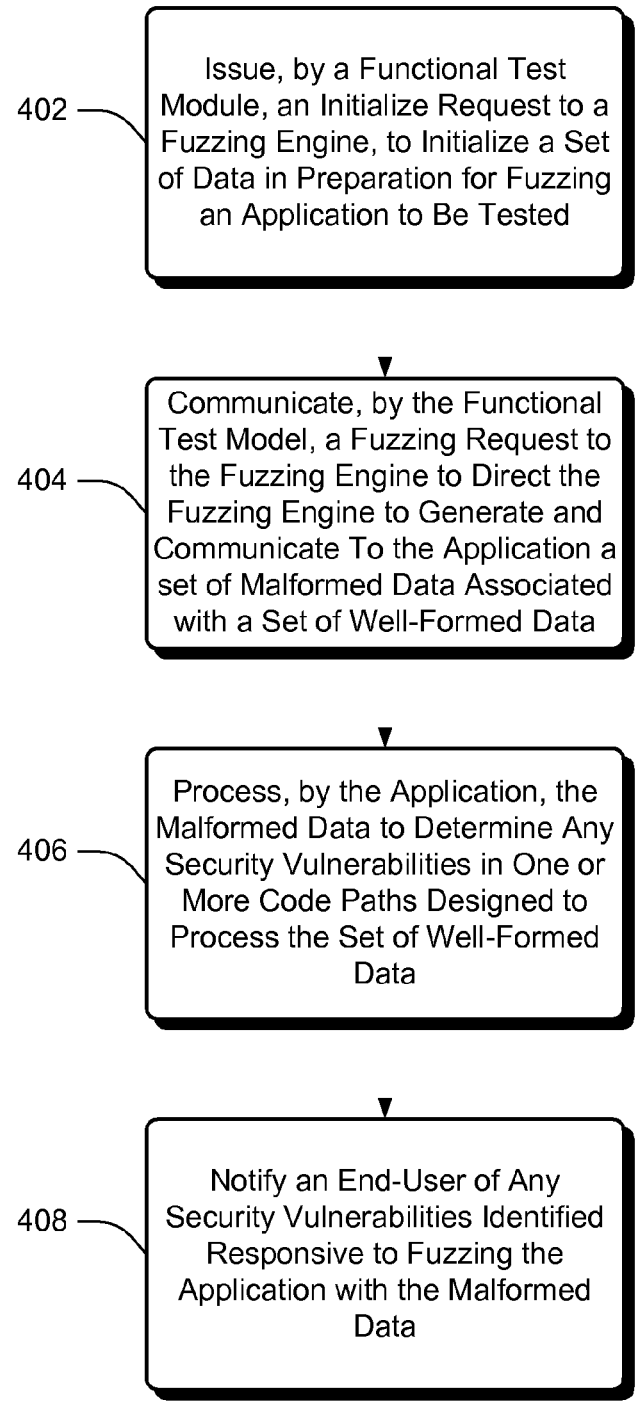
FIG. 4 shows an exemplary procedure for use of an application programming interface to generate and deliver malformed data for software application fuzzing, according to one embodiment.

FIG. 4 shows an exemplary procedure for use of an application programming interface to generate and deliver malformed data for software application fuzzing, according to one embodiment. For purposes of exemplary illustration and discussion, aspects of FIG. 4 are described with respect to FIG. 1. For example, the left-most numeral of a reference number indicates the particular figure where the component was first introduced.

Referring to FIG. 4, operations at block 402 issue, by a functional test module (e.g., a test automation tool 118), and initialize request to a fuzzing engine. The request is to initialize a set of data in preparation for fuzzing an application 124. In one implementation, the request is a Fuzzer.Initialize request of a fuzzing API 128. Operations of block 404 communicate a fuzzing request to the fuzzing engine 116 to direct the fuzzing engine to generate and communicate to the application 124 a set of malformed data 122. The set of malformed data 122 is associated with a set of well-formed data 126. In one implementation, the fuzzing request is a Fuzzer.DoFuzzing request of the fuzzing API 128. Operations at block 406 process, by the application being tested, the malformed data 122 to determine any security vulnerabilities in one or more code paths. The one or more code paths are designed to properly process the well-formed data from which the malformed data was generated. Operations at block 408 notify an end-user of any security vulnerabilities identified responsive to fuzzing the one or more code paths with the malformed data.

Figure 5:
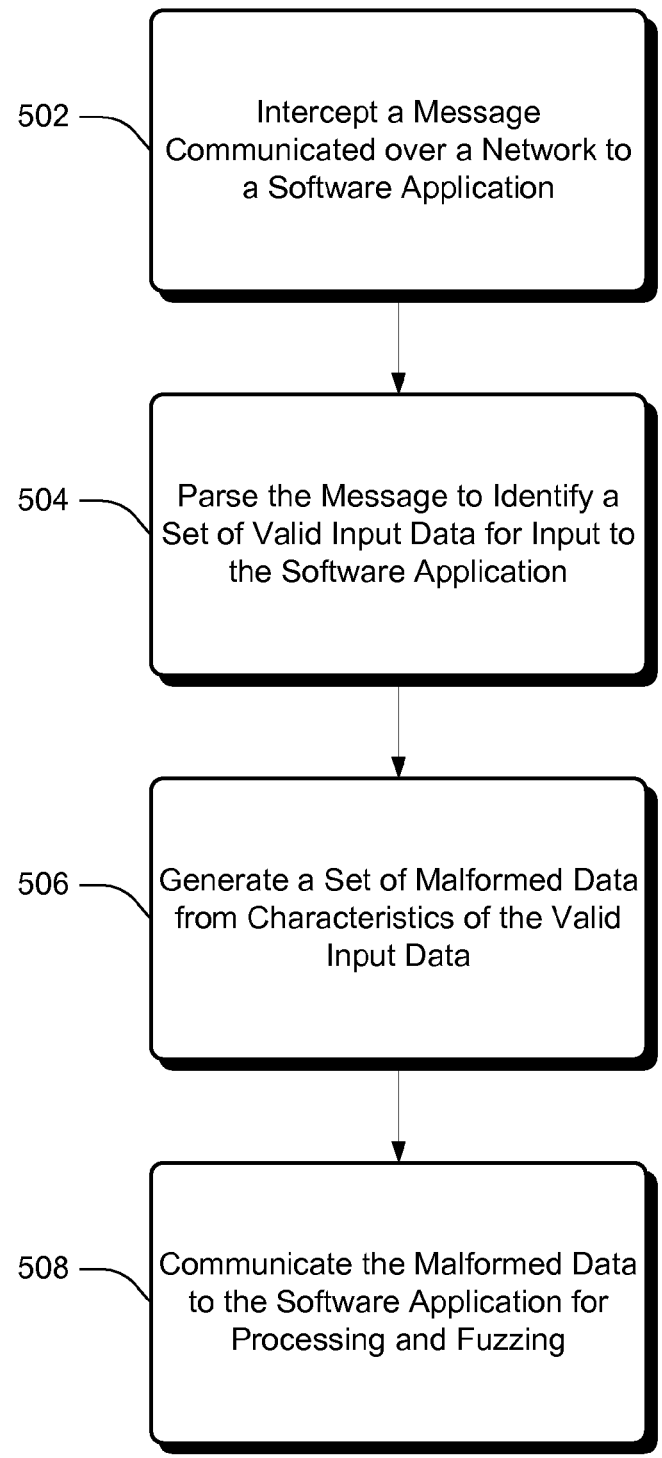
FIG. 5 shows an exemplary procedure for a network proxy to generate and deliver malformed data for software application fuzzing, according to one embodiment.

FIG. 5 shows an exemplary procedure for a network proxy to generate and deliver malformed data for software application fuzzing, according to one embodiment. For purposes of exemplary illustration and discussion, aspects of FIG. 5 are described with respect to FIG. 1. As in the above figures, the left-most numeral of a reference number indicates the particular figure where the component was first introduced. Referring to FIG. 5, operations at block 502 intercept a message communicated over a network 104 to a software application 124 for testing. Operations of block 504 parse the message to identify a set of valid input data 126 for input to the software application being tested. Operations of block 506 generate a set of malformed data 122 from characteristics of the valid input data. In one implementation, such characteristics are specified by a fuzzing data schema 132. In another implementation, such characteristics are specified by well-known fuzzing algorithms that fuzz data based on data type, etc. Operations of block 508, communicate the malformed data to the software application being tested for processing and fuzzing of the software application. These operations assist a user in identifying any security vulnerabilities associated with fuzzed code paths of the software application.

Alternate Embodiments

Although system 100 of FIG. 1 has been described as using valid input data 126 (generated from fuzzing data schema 132) merely to generate structure and content associated with malformed data 122, in another implementation valid input data 126 is used for additional purposes. For example, in one implementation, valid input data 126 is utilized to perform functional testing and/or results of software application 124 (this is as compared to utilizing malformed data 122 to identify code portions of software application 124 with security vulnerability). For purposes of exemplary illustration, testing tool 118 also inputs data from valid input data 126 into software application 124 to test operations of software application 124. For example, in one embodiment, valid input data 126 specifies content of one or more messages for communication to the software application 124 according to a specific protocol described by the fuzzing data schema 132. In this embodiment, the testing tool communicates at least a subset of the messages to the software application 124 to validate whether the software application properly processes the received messages. This is only one arbitrary example of using a particular exemplary aspect of valid input data 126 to test proper functioning of software application 124. There are many different scenarios where different types of valid input data 126 are used to test operations of software application 116.

Conclusion

Although the above sections describe delivering malformed data for fuzz testing software applications in language specific to structural features and/or methodological operations or actions, the implementations defined in the appended claims are not necessarily limited to the specific features or actions described. Rather, the specific features and operations to deliver malformed data for software application and fuzzing are disclosed as exemplary forms of implementing the claimed subject matter.

The invention claimed is:

1. A method comprising:
   receiving, by a fuzzing engine of a computing device, data from a test automation tool, the fuzzing engine and the test automation tool being respective independent computer-program modules, the data being well-formed data for input into an application for testing;
   changing, by the fuzzing engine, the data to generate malformed data, the changing comprising:
      parsing the data to generate a tree of groups and elements and corresponding attributes to represent the well-formed data;
      corrupting at least a subset of the elements in the tree based at least partly on one or more vulnerability patterns;
      serializing the tree having the corrupted elements to convert the tree into a fuzzed data buffer;
      attempting to match the parsed data to characteristics in a fuzzing data schema and a current state of the test automation tool; and
      passing the parsed data to the application when it is determined that there is no match; and
   when it is determined that there is a match, fuzzing the application with the malformed data to identify any security vulnerabilities in one or more code paths of the application; and providing a notification of any security vulnerability identified responsive to the fuzzing.

2. The method of claim 1, wherein;
the fuzzing engine is implemented in a network proxy;
the network proxy intercepts the data over a network; and
the malformed data is forwarded to the tested application at least partly by the network proxy.

3. The method of claim 1, wherein the fuzzing engine receives the data from a device driver, the device driver having intercepted the data from the test automation tool in route to the tested application.

4. The method of claim 1, wherein the test automation tool is designed to implement functional tests with the data without fuzz testing.

5. The method of claim 1, wherein the fuzzing engine uses the fuzzing data schema to determine characteristics of the well formed data and generate one or more permutations of malformed data based on the characteristics.

6. The method of claim 1, wherein the fuzzing is implemented via an Application programming Interface (API), the test automation tool implementing a first part of the API, and the fuzzing engine implementing a second part of the API.

7. The method of claim 6, wherein the first part comprises an interface that allows the fuzzing engine to send malformed data to the application via one or more pre-specified data input mechanisms.

8. The method of claim 7, wherein the pre-specified data input mechanisms comprise one or more of an API and a socket.

9. The method of claim 6, wherein the second part comprises an interface that allows the test automation tool to direct the fuzzing engine to malform a set of valid well formed data inputs and send the set to the application for fuzzing one or more code paths.

10. The method of claim 1, further comprising allowing the application to execute to a predetermine application state before implementing the fuzzing.

11. The method of claim 1, wherein the test automation tool uses a fuzzing API to direct the fuzzing engine to not fuzz the application with malformed data until the predetermine application state has been reached.

12. A method comprising:
receiving, by a computing device, well-formed data for input into an application for testing;
changing, by the computing device, the well-formed data to generate malformed data, the changing comprising:
parsing the well-formed data to generate a tree of groups and elements and corresponding attributes to represent the well-formed data, the tree isolating valid element data associated with respective individual elements of valid data so that the malformed data is generated from respective ones of the isolated valid element data;
applying one or more fuzzing algorithms to at least a subset of the elements in the tree to corrupt the subset of elements based at least partly on one or more vulnerability patterns; and
matching the parsed well-formed data to characteristics in a fuzzing data schema or a current state of a test automation tool;
fuzzing, by the computing device, the application with the malformed data to identify any security vulnerabilities in one or more code paths of the application; and
providing, by the computing device, a notification of any security vulnerability identified responsive to the fuzzing.

13. The method of claim 12, wherein the operations further comprise:
intercepting the well-formed data over a network; and
delivering the malformed data via a network proxy to the tested application.

14. The method of claim 12, wherein the operations further comprise implementing functional tests with the data.

15. The method of claim 12, wherein the changing further comprises:
passing the parsed well-formed data to the application when it is determined that there is no match; and
fuzzing the application if it is determined that there is a match.

16. The method of claim 12, wherein the operations further comprise utilizing the fuzzing data schema to determine characteristics of the well-formed data and to generate one or more permutations of malformed data based on the characteristics.

17. A system comprising:
one or more processors; and
memory, communicatively coupled to the one or more processors, for storing:
a fuzzing engine configured to:
receive data from a test automation tool, the data being well-formed data for input into an application for testing;
change the data to generate malformed data by:
parsing the data to generate a tree of elements to represent the well-formed data;
corrupting the elements based at least partly on one or more vulnerability patterns in order to create a mutated tree;
serializing the mutated tree to convert the mutated tree into a fuzzed data buffer;
attempting to match the parsed data to characteristics in a fuzzing data schema and a current state of the test automation tool; and
determining that the parsed data belongs to a state different from the current state of the test automation tool and passing the parsed data to the application when there is no match; and
when there is a match, fuzz the application with the malformed data to identify any security vulnerabilities in one or more code paths of the application.

18. The system of claim 17, wherein the fuzzing engine is further configured to provide a notification of any security vulnerability identified in response to the fuzzing.

19. The system of claim 17, wherein the fuzzing engine is further configured to:
receive a request to initialize a set of data in preparation for fuzzing the application to be tested; and
fuzz the application with the malformed data in response to receiving a communication from a functional test module.

20. The system of claim 17, wherein the fuzzing engine is further configured to:
intercept a message communicated over a network to the application; and
fuzz the application with the malformed data at least partly in response to intercepting the message.

* * * * *